W. H. CRONK.
BREAD SLICING MACHINE.
APPLICATION FILED SEPT. 2, 1914.

1,123,176.

Patented Dec. 29, 1914.
2 SHEETS—SHEET 1.

Witnesses:
H. B. Davis.
R. Connell.

Inventor:
W. H. Cronk

W. H. CRONK.
BREAD SLICING MACHINE.
APPLICATION FILED SEPT. 2, 1914.

1,123,176.

Patented Dec. 29, 1914.
2 SHEETS—SHEET 2.

Witnesses:
H. B. Davis.
R. Connell.

Inventor:
W. H. Cronk

UNITED STATES PATENT OFFICE.

WILLIAM H. CRONK, OF BRADFORD, MASSACHUSETTS, ASSIGNOR OF ONE-HALF TO GERRY C. MESSER, OF HAVERHILL, MASSACHUSETTS, AND ONE-HALF TO ERNEST L. MORANDI, OF BOSTON, MASSACHUSETTS.

BREAD-SLICING MACHINE.

1,123,176.     Specification of Letters Patent.     Patented Dec. 29, 1914.

Application filed September 2, 1914. Serial No. 859,899.

*To all whom it may concern:*

Be it known that I, WILLIAM H. CRONK, a citizen of the United States, residing at Bradford, in the county of Essex and State of Massachusetts, have invented an Improvement in Bread-Slicing Machines, of which the following is a specification.

This invention relates to that class of machines which are adapted to cut loaves of bread into slices. Prior to my invention various devices for this purpose have been produced, said devices usually involving a rotary knife, and a feeding-means for moving the loaf toward the knife on each rotation of the latter. While such devices have been found to be more or less effective according to conditions, yet they have also been found to be objectionable in certain respects, particularly in that, unless the knife is very sharp, it will compress, or jam the bread, to an objectionable extent, while cutting it, especially if the bread is soft. With many of these devices, it is also particularly difficult to cut the bread into thin slices. Moreover, the speed with which they may be operated is often insufficient to meet requirements.

The objects of my invention are to provide an improved form of bread-slicing machine which will slice bread without compressing it to an objectionable extent, which is adapted to slice a plurality of loaves at the same time, so that a large number of loaves may be quickly sliced, which is adapted to be readily adjusted so that it will cut the bread into slices of various thickness, whether thin or thick, and which is so constructed that it is unlikely to get out of order with ordinary use. I accomplish these objects by providing a revolving bread-holder, having a plurality of vertically disposed, open ended, loaf-receiving chambers, which is arranged to revolve about a vertically disposed axis, above a loaf supporting table, upon which a horizontally disposed knife is stationarily supported at a suitable distance thereabove, so that the loaves of bread in said chambers may be fed by gravity and will be cut into slices of uniform thickness, as the holder is revolved.

Figure 1:
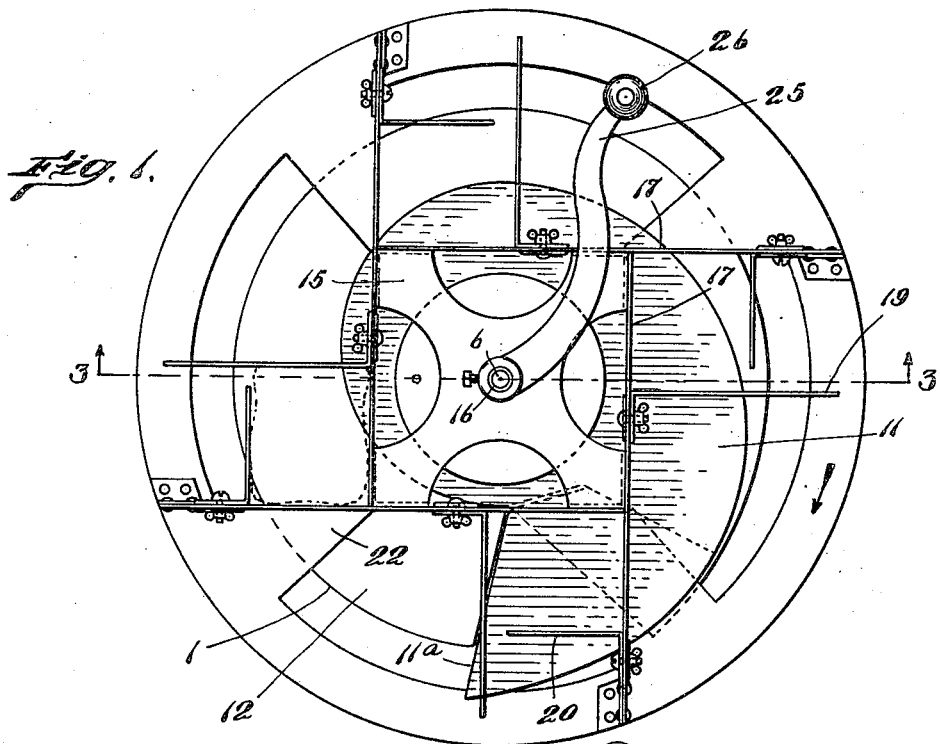
Figure 2:
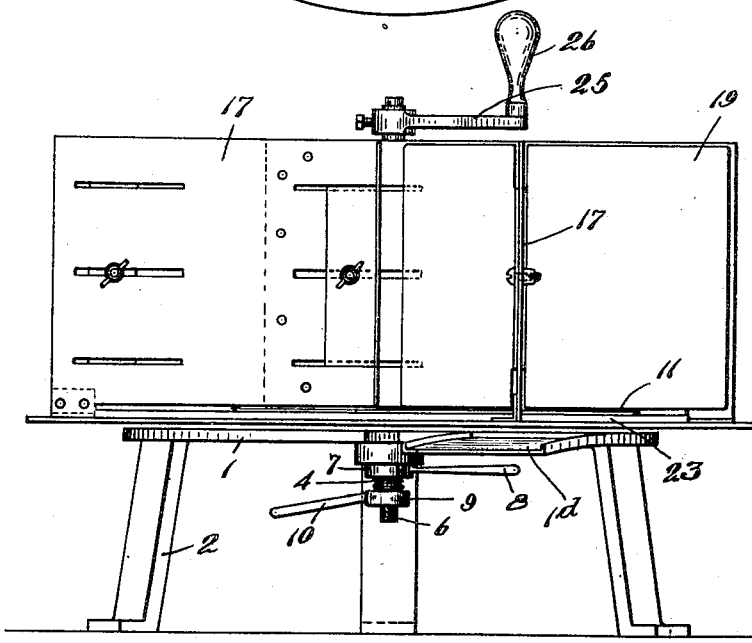
Figure 3:
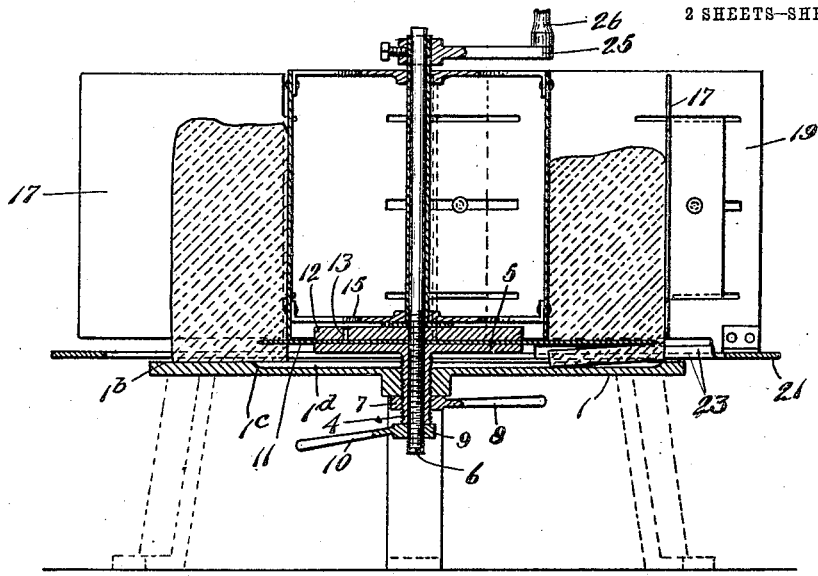
Figure 6:
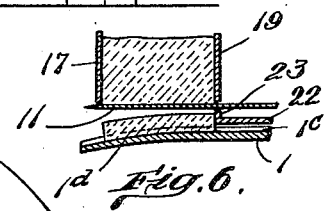
Figure 4:
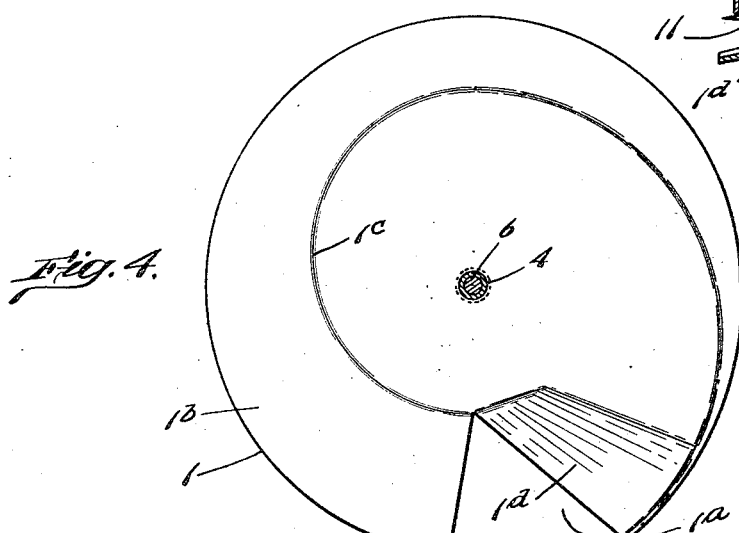
Figure 5:
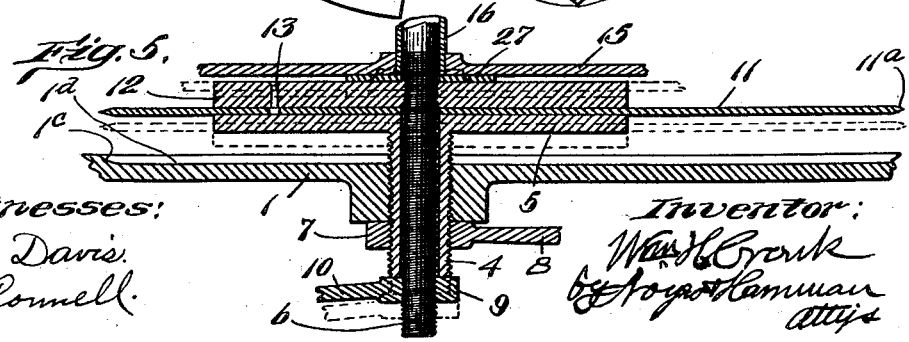

For a more complete understanding of my invention, reference is made to the accompanying drawing in which, Figure 1, is a plan view of a bread-slicing machine embodying my invention. Fig. 2 is a side elevation thereof. Fig. 3, is a central-vertical section-view on line 3—3 of Fig. 1. Fig. 4, is a detail plan view of the loaf-supporting table. Figs. 5 and 6 are detail sectional views on enlarged scales, of the knife supporting and slice delivering means, respectively.

As shown in the drawing, a horizontally disposed table 1 is provided, which is supported by a series of legs 2 extending from the underside thereof. Said table is circular in form, and has a central-vertical aperture therein, into which a sleeve 4, which projects from the underside of a circular knife-support 5, is threaded, said support having a horizontal, knife-supporting face on its upper side, which may be held at different distances from the top of the table by screwing said support up or down. A lock nut 7, having a handle 8, is threaded on said sleeve to lock said support in the different positions to which it may be adjusted.

A flat knife 11, having a spirally formed cutting edge, which extends outwardly and circularly, in relation to its center, from the inner end of its back edge, 11$^a$, to the outer end thereof, is arranged on the upper face of the support 5, and a clamping plate 12, of circular form, is arranged on the upper side of said knife. A rod 6 is threaded in said plate 12, said rod extending centrally therethrough, and through said knife 11, support 5, and sleeve 4. A lock nut 9, having a handle 10, is threaded on the lower end of rod 6 and is adapted to be screwed against the lower end of sleeve 4, to lock said parts to the support 5. Said plate 12, is preferably provided with a projection 13, which is adapted to enter a corresponding aperture in the knife 11, to prevent relative rotation of said knife and plate.

The upper surface of the table 1 is horizontal and is notched from its outer edge toward its center to provide a discharge opening 1$^a$, said upper surface being provided with a supporting face 1$^b$, which extends circularly thereof, the inner edge 1$^c$, of said face, extending spirally outward from said opening 1ª in a curve which corresponds to the curve of the edge of the knife 11, a recess being provided within said edge 1ᶜ which gradually increases in width as it extends about the center of the table to the discharge opening 1ª, the bottom thereof being inclined downwardly at its end to form a discharge lip 1ᵈ.

A square plate 15, having the middle portions of its side edges recessed to reduce the weight, is mounted at its center on a sleeve 16, through which the rod 6 passes, and on which said sleeve is adapted to rotate, said plate and sleeve being rigidly secured together. Four vertically-disposed plates 17 are respectively secured at their lower edges to the edges of the plate 15, each plate 17 extending from one corner, and along one edge of the plate 15, to a point some distance beyond the next corner, and terminating at a point approximately over the outer edge of the table 1, the inner end of each plate 17 butting against an intermediate portion of the next plate 17, and being connected thereto, forming a rigid structure. Each of said plates 17, has two flat brackets 19 and 20, secured to opposite sides thereof, and extending throughout the entire width thereof, at right angles thereto, each bracket 19 being connected to, and projecting from the portion of its corresponding plate 17 which is between the corners of the supporting plate 15, and each bracket 20 being connected to the projecting portion of its plate 17, and extending at right angles to and closely adjacent the bracket 19 of the next plate 17. A tongue and slot connection is provided between said brackets 19 and 20 and their respective plates 17, which permits said brackets to be adjusted laterally, or longitudinally of the plate 17, bolts and nuts being provided for locking them in the positions to which they may be adjusted. Four vertically disposed rectangular-shaped compartments are thus provided which are adapted to be varied in length and width by adjusting the brackets 19 and 20. A flat annular rim 21 is secured to the lower edges of the plates 17 at their outer ends, and said rim is provided with four flat arms 22 which extend inwardly therefrom beneath the knife 11, and in close proximity to its underside, and a flange 23 is provided on one edge of each arm 22, the face of which is arranged directly beneath, and practically in the plane of one of the corresponding plates 17. A crank 25, having a handle 26, is secured to the upper end of the sleeve 16, by means of which said sleeve 16, and the parts carried thereby, may be rotated upon the rod 6.

The plate 15 which supports the holder, formed by the plates 17 and brackets 19 and 20, may rest directly on the clamping plate 12, but, preferably, a suitable bearing device, as the wear plate 27, may be provided therebetween.

When the machine is assembled, the knife 11 is set so that its cutting edge is directly over the inner edge 1ᶜ of the face 1ᵇ, throughout the entire length of said edge, and the knife holder is adjusted so that the distance between the face 1ᵇ and the edge of the knife 11 is equal to the desired thickness of slice to be cut. The brackets 19 and 20 are also adjusted, so that the compartments formed by said brackets and said plates 17 will be adapted to receive a loaf of bread lengthwise and hold it loosely, so that it may fall freely in the compartment in which it is placed, and so that its lower end will rest either on the knife 11 or on the surface 1ᵇ, of the table.

In practice, a loaf of bread is placed in each compartment, and the holder is then rotated in the direction of the arrow in Fig. 1, by means of the crank 25. As the holder is rotated, a loaf will be slid laterally along on the knife until it passes therefrom and will then move, by its gravity, until it rests on the face 1ᵇ, of the table. As the rotary movement is continued, the loaf will be slid along on said face and pressed into engagement with the edge of the knife, which engages the bread at the point at which the slice is to be removed. As the loaf is slid around on the face 1ᵇ, the depth of the cut made therein by the knife will be increased, the slice being severed by the time the loaf reaches the back edge 11ª of the knife. As the slice is severed, it will be pressed into the recess of the table within the face 1ᵇ by the knife, as illustrated in Fig. 3, so that the slice will not be jammed between the knife and the support beneath it, and as the slice is finally severed, it will be carried entirely from the face 1ᵇ into said recess, and will be pushed by a flange 23 down the inclined lip 1ª through the discharge opening 1ª where it may be received by a suitable receptacle placed therebeneath. As soon as the loaf passes beyond the back 11ª of the knife, it will again be fed down by gravity, so that its end rests upon the face 1ᵇ, and the operation will be repeated.

It will be observed that the slicing operation may be carried on upon four loaves of bread simultaneously, so that, when a loaf of bread has been placed in each compartment, four slices will be delivered upon each complete rotation of the holder. To vary the thickness of the slices, it is necessary, merely to loosen the nut 7, which locks the sleeve 4, so that the holder 5 may be either raised or lowered with relation to the table, as illustrated in full and dotted lines in Fig. 5. The knife may also be readily removed for sharpening by removing the clamping nut of the rod 6, and removing the rod, clamping plate, and holder from the table, and turning back the knife until it passes outside the arms 22.

While the above described machine is primarily designed and especially adapted to slice loaves of bread, it may be employed to slice other substances.

I claim:—

1. In a slicing machine, a stationary knife having a peripheral cutting-edge which extends circularly and outwardly with relation to a center, a holder mounted to rotate about an axis extending perpendicularly to said knife adjacent said center and having a loaf-receiving compartment arranged perpendicularly relative to the knife and opening thereto at one end in position to be carried obliquely across said cutting-edge, as the holder is rotated, and a table at the opposite side of the knife from said holder for holding the loaf in said compartment in predetermined relation to the knife.

2. In a slicing machine, a stationarily supported knife having a peripheral cutting edge extending about a center at increasing distances therefrom, and a holder mounted to rotate about an axis disposed perpendicularly to said knife adjacent said center, and having a plurality of circularly arranged, loaf-receiving compartments therein, opening to said knife at their lower ends, at different longitudinal points of its cutting edge, and movable over said knife obliquely to said edge as the holder is rotated, to cause a plurality of loaves, held in said holder, to be simultaneously operated upon by said knife.

3. In a slicing machine, a stationarily supported knife, a holder mounted to rotate about an axis disposed perpendicularly to said knife and having a series of loaf-receiving compartments therein, opening to said knife at one end, said compartments being arranged equidistant from said axis in spaced relation and in a path which extends obliquely across said cutting edge, as the holder is rotated, and a gage at the opposite side of said knife from the holder in advance of said cutting edge, for holding the loaf in said compartments in predetermined relation to the knife.

4. In a slicing machine, a horizontally disposed knife, a holder mounted thereover to rotate about a vertically disposed axis, and having an open-bottomed, loaf-receiving compartment therein, arranged to be carried transversely of the edge of the knife, when the holder is rotated, and a table arranged below the level of the knife, in advance of its edge, to support a loaf in said compartment, in predetermined relation to the knife.

5. In a slicing machine, a stationary, horizontally disposed knife having a circularly extending, peripheral cutting edge, arranged at increasing distances from a center, a holder mounted to rotate above the knife about an axis vertically disposed adjacent said center and having a loaf-receiving compartment opening to said knife, at its lower end, and movable in a path which extends transversely of said cutting edge, and a table beneath the knife, and in front of said edge, for supporting the loaf in said compartment in predetermined relation to the knife.

6. In a slicing machine, a stationary, horizontally disposed knife having a spirally extending cutting edge, a holder mounted to rotate above the knife about a vertically disposed axis and having a loaf-receiving compartment opening at its lower end to said knife and arranged to be moved in a circular path transversely and longitudinally of said edge and a table beneath said knife for supporting a loaf in said compartment in advance of the knife while it is operated on thereby.

7. In a slicing machine, a horizontally disposed knife, a holder mounted thereover to rotate about a vertically disposed axis and having a plurality of open-bottomed, loaf-receiving compartments arranged to be successively carried transversely of the edge of the knife when the holder is rotated, and a table arranged below the level of the knife, in advance of its edge, to support the loaves in said compartments in predetermined relation to said knife.

8. In a slicing machine, a horizontally supported knife having a circularly extending, peripheral cutting edge arranged at an increasing distance from a center, a holder mounted to rotate above the knife about an axis vertically disposed, adjacent said center, and having a plurality of loaf-receiving compartments correspondingly arranged in vertically disposed positions about said axis and opening at their lower ends to said knife, the path of movement of said compartments, as the holder is rotated, extending obliquely across said cutting edge, and a table disposed below the level of said knife, in advance of its said edge, to support the loaves in said compartments in predetermined relation to the knife.

9. In a slicing machine a table having a horizontally disposed face extending circularly with relation to a center, a knife, stationarily supported within said face and disposed thereabove in parallelism therewith, said knife having a peripheral cutting edge extending about said center adjacent the inner edge of said face, a holder rotatably mounted above said knife to move about an axis extending perpendicularly adjacent said center, said holder having a loaf-receiving compartment open at its lower end and arranged to pass over said face and said knife, as the holder is rotated, to carry the loaf therein in engagement with said edge and over the knife, while supported by said face.

10. In a slicing machine, a table having an engaging face extending circularly with relation to a middle point, and receding therefrom at its inner edge as it extends about the same, a knife stationarily mounted within said face, and disposed in parallelism therewith, and at a distance therefrom corresponding to the thickness of the slice to be cut, said knife having a peripheral cutting edge extending about and outwardly, with relation to said middle point, from points adjacent the innermost portions of said face, and means to move the article to be sliced obliquely across said cutting edge, from the inner to the outer portions while held against said face.

11. In a slicing machine, a table having a horizontally disposed supporting face extending circularly with relation to a middle point and receding therefrom at its inner edge as it extends about the same, a knife stationarily mounted within said face, and disposed thereabove in parallelism therewith, said knife having a peripheral cutting edge disposed directly over said inner edge and means to move the article to be sliced circularly about said point, while supported by said face to carry the same across the knife.

12. In a slicing machine, a stationarily mounted knife having a peripheral cutting edge extending spirally outward about a center, a table having an engaging face arranged in advance of, and beyond said cutting edge in parallelism with said edge and at a perpendicular distance therefrom corresponding to the thickness of the slice to be cut, means to move the article to be sliced over said face, while held thereagainst, and transversely of said edge in an oblique direction relative thereto.

13. In a slicing machine, a stationarily supporting knife, a holder having an open-ended, loaf-receiving compartment vertically arranged with relation to the knife and rotatable about an axis also vertically arranged with relation to said knife to carry a loaf in said compartment transversely of the cutting-edge of the knife, a gage at the opposite side of the knife from the holder for holding the loaf in said compartment in predetermined relation to the knife, in advance of the cutting-edge thereof, and means permitting relative adjustment of said knife and gage to vary the perpendicular distance therebetween.

14. In a slicing machine, a circular table having a supporting face extending about its center, the inner edge thereof receding from said center as it extends about the same, and having a slice-receiving recess within said face and a radially extending discharge opening through the bottom of said recess at the end thereof, a knife stationarily supported over said recess above the level of said supporting face and having a peripheral cutting edge extending approximately coincident with said inner edge of said face and means to move the article to be sliced into engagement with and over the knife while supported by said face.

15. In a slicing machine, a table having a horizontally disposed loaf-supporting face, a knife stationarily supported upon said table, above and in a plane parallel to said face, a holder rotatably mounted on said table above said knife to move about an axis perpendicular to said face, and having a loaf-receiving compartment, open at its lower end and arranged to pass over said face and said knife as the holder is rotated, to carry the loaf into engagement with the cutting edge of the knife while supported on said face, and means permitting vertical adjustment of said knife and holder with relation to said table.

16. In a slicing machine, a circular table having a radially extending discharge opening, a supporting face extending about the table center between opposite sides of said opening and a similarly extending slice-receiving recess within said face, said face gradually decreasing, and said recess correspondingly increasing in width from one point to the other, a knife stationarily supported over said recess having a peripheral cutting edge extending approximately coincidently with said inner edge of said face, throughout the length thereof, and a holder rotatable about an axis at the table center to carry the article to be sliced across said cutting edge, while held against said face.

17. In a slicing machine, a table having a circularly extending, horizontally disposed loaf-supporting face, a knife stationarily mounted upon said table at a distance above said face, and in parallel relation thereto, said knife having a cutting-edge which extends circularly and outwardly with relation to the middle portion of the table, said face being arranged beyond the knife and said table having a slice-receiving recess directly beneath the knife below the level of said face, and having a discharge opening at the end of said recess, and means to move the loaf to be sliced transversely of said cutting edge while supported on said face.

18. In a slicing machine, a table having a circularly extending, horizontally disposed loaf-supporting face, a knife stationarily mounted upon said table at a distance above said face, and in parallel relation thereto, said knife having a cutting-edge which extends circularly and outwardly with relation to the middle portion of the table, said face being arranged beyond the knife and said table having a slice-receiving recess directly beneath the knife below the level of said face, and having a discharge opening at the end of said recess, means to move the loaf to be sliced transversely of said cutting edge while supported on said face, and means to engage the slice after it has been severed to push it to said discharge opening.

In testimony whereof, I have signed my name to this specification, in the presence of two subscribing witnesses.

WILLIAM H. CRONK.

Witnesses:
H. B. DAVIS,
L. H. HARRIMAN.